Sept. 22, 1942.   F. K. FISCHER   2,296,710
HIGH PRESSURE SEALING HEAD
Filed April 23, 1938
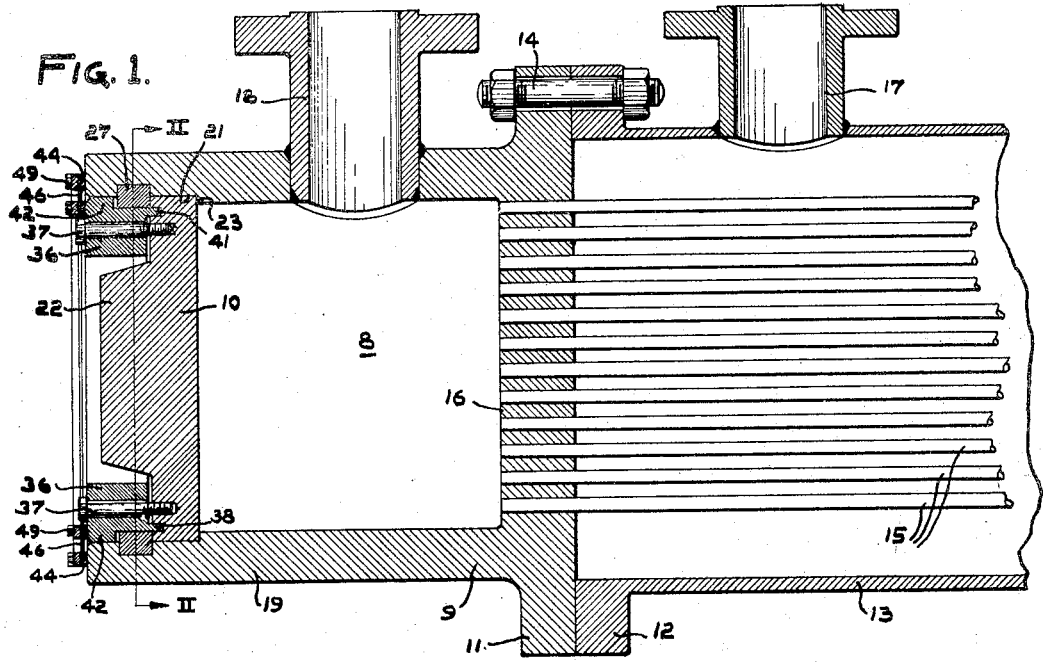
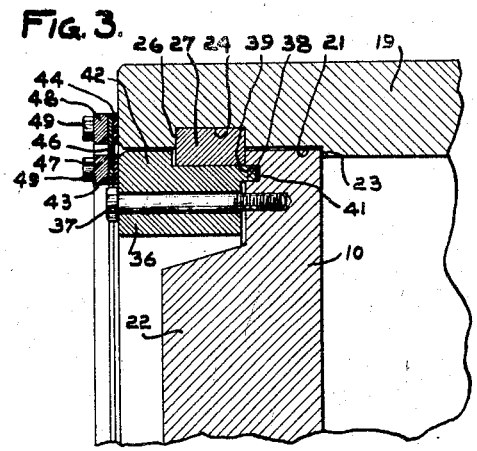
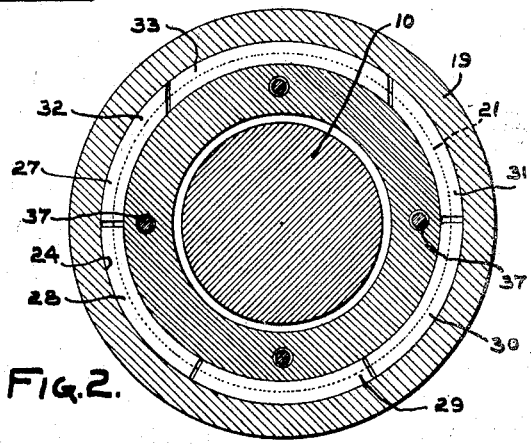
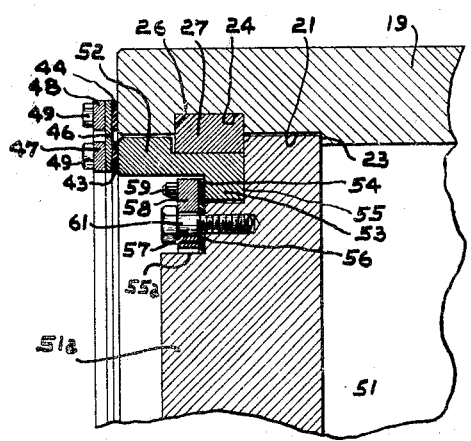
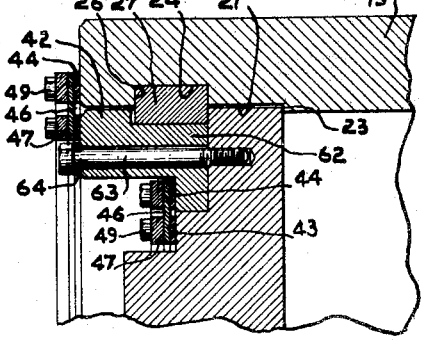
INVENTOR
FREDERICK K. FISCHER
BY
ATTORNEY Patented Sept. 22, 1942

2,296,710

UNITED STATES PATENT OFFICE 2,296,710

HIGH PRESSURE SEALING HEAD

Frederick K. Fischer, Prospect Park, Pa., assignor to Westinghouse Electric & Manufacturing Company, East Pittsburgh, Pa., a corporation of Pennsylvania Application April 23, 1938, Serial No. 203,809

3 Claims. (Cl. 220—46)

This invention relates to closures for pressure vessels and more particularly to covers and closure members for high-pressure heads of heat-exchange apparatus.

An object of the invention is the provision of a closure for high-pressure heads wherein the internal pressure load is transmitted to a shear ring.

A further object of the invention is the provision of a high-pressure head wherein the use of heavy flanges and large bolts is avoided by use of shear ring in conjunction with novel sealing means.

Another object of the invention is the provision of a high-pressure head in which the only bolts are those required to produce the necessary gasket pressure at the sealing joints.

Another object of the invention is the provision of closure means for high-pressure heads which will take sealing pressure loads in either direction equally well.

Another object is the provision of a relatively flexible sealing member to take care of any variations in dimensions of parts, and any slight movement of the cover with respect to the body.

These and other objects are effected by the invention as will be apparent from the following description and claims taken in connection with the accompanying drawing, forming a part of this application, in which:

Fig. 1 is a longitudinal sectional view of a portion of a tubular heat exchanger constructed in accordance with the invention;

Fig. 2 is a sectional view taken on the line II—II of Fig. 1, looking in the direction of the arrows;

Fig. 3 is an enlarged sectional view of a portion of the structure of Fig. 1; and, Figs. 4 and 5 are views similar to Fig. 3, illustrating modifications of the invention.

In the drawing, there is shown a high-pressure head at 8, including a body member 9 and a cover 10. The body member has a flange 11 at one end for attachment to the flange 12 of the shell 13, by suitable means, such as bolts 14. Tubes 15 have terminal portions secured in the tube plate wall 16 of the body member and they extend longitudinally through the shell to the outlet end (not shown) of the heat exchanger. As is usual, the shell 13 has an inlet 17; and, where the heat exchanger is of the single-pass type, as herein illustrated, the body member is provided with an inlet 18 in its cylindrical wall 19 for the admission of fluid under high pressure. The cover 10 is detachably connected interiorly of the outer end of the wall 19 by the means hereinafter described.

Preferably, the open outer end of the cylindrical wall 19 is counterbored at 21 to receive the cover 10. The counterbore provides an outwardly-facing radial shoulder or face 23 against which the inner face of the cover abuts, and has an annular recess or groove 24 providing an inwardly-facing thrust shoulder 26. A shear ring 27 fits in the recess 24 and abuts the thrust shoulder 26 with its inner face contacting the outer face of the cover 10.

To facilitate assembly of the shear ring 27 in the groove 24, the former is divided into a plurality of arcuate sections, for example, 28, 29, 30, 31, 32, and 33. To provide for contiguity of adjacent end faces of the sections and for insertion and removal of the latter, all of such faces extend radially except the faces at either end of the section 33, which are parallel, thereby providing for insertion of the latter section last and removal thereof first.

The shear ring sections are held in position by a retaining ring 36 connected by bolts 37 to the cover 10. The retaining ring is provided on its inner face with an annular, axially-projecting rib 38 extending into the annular groove 39 formed in the cover, a gasket 41 being located in the bottom of the groove and acted upon compressively by the rib. The necessary sealing pressure is obtained by tightening of the bolts 37, the latter serving the double purpose of holding the retaining ring in place and of compressing the sealing gasket 41.

The retaining ring is further provided with an outwardly-extending radial flange or lip 42 providing suitably small clearance with respect to the interior surface of the cylinder wall 19. Such annular clearance is covered by a straddle type seal comprising a pair of annular gasket members 43 and 44 abutting the outer end faces of the retaining ring and of the cylindrical wall, respectively, and an annular sealing plate 46 overlying the two gaskets and bridging the space therebetween. Preferably, the sealing plate is made of relatively thin and flexible metal to accommodate unavoidable variations in dimensions of parts. Outer rings 47 and 48 are connected by bolts 49 to the cover and the cylindrical wall and serve to exert clamping action on the sealing plate such that the latter is sealed with respect to the cover and the cylindrical wall by the gaskets 43 and 44.

The central portion of the cover is materially thickened, as at 22, to provide for increased stiffness, and the outer edge portion has sufficient thickness to afford adequate resistance to shear.

In Fig. 4, there is shown a modification of the above-described construction which differs therefrom in the provision of an alternative arrangement of seal between the retaining ring and the cover.

To this end, the retaining ring 52 has an inner radial flange or lip 53 providing an outer face 54, and the cover 51 is formed with inner and outer rabbets 55 and 55a, respectively, the inner rabbet providing an outer face 56 aligned with the face 54, the cylindrical surfaces of the flange and of the rabbet fitting closely, with the relatively narrow annular clearance therebetween sealed by the annular gasket 57. An outer ring 58 is connected by bolts 59 and 61 to the retaining ring and cover, respectively, and serves to exert sealing pressure on the gasket. Preferably, the bolts 61 are of such a size as not only to exert sufficient pressure for sealing, but also to prevent displacement of the retaining ring.

The cover 51 is formed with a second rabbet providing a thickened central outer portion 51a for increased stiffness, the outer edge portion of the cover having sufficient thickness to afford adequate resistance to shear.

In Fig. 5, there is shown a further modification differing from that of Fig. 4 in that the main body portion of the retaining ring 62 is of increased radial dimension to provide for extension therethrough of the bolts 63 serving to prevent displacement thereof and which are provided with sealing means 64 beneath their heads. The annular joint between the retaining ring and the cover is sealed by a straddle-type structure such as already described.

In each of these constructions, the head will take loads in either direction, that is, pressure inwardly of the head will be taken by the shear ring 27, and pressure outwardly of the head will be taken by the thrust shoulder 23. The various sealing means disclosed will function equally well with pressures in either direction.

While I have shown my invention in several forms, it will be obvious to those skilled in the art that it is not so limited but is susceptible of various other changes and modifications without departing from the spirit thereof, and I desire, therefore, that only such limitations shall be placed thereupon as are imposed by the prior art or as are specifically set forth in the appended claims.

What I claim is:

1. Apparatus of the character described comprising a hollow pressure sustaining body member having an opening at one end and a thrust shoulder adjacent said opening, a cover in the opening disposed inwardly of the thrust shoulder, a plurality of shear pieces between the cover and the thrust shoulder for transmitting pressure from the former to the latter, a retaining ring for preventing displacement of the shear pieces, said retaining ring having an annular rib projecting from one face thereof, the cover having an annular groove in one face thereof, to closely receive the annular rib on the retaining ring, an annular member sealing the joint between the body member and the retaining ring, a sealing member in the bottom of the annular groove, and means for forcing the retaining ring toward the cover to compress the sealing means between the bottom of the groove and the top of the rib therein.

2. Apparatus of the character described comprising a hollow pressure sustaining body member having an opening at one end and a thrust shoulder adjacent said opening, a cover in the opening disposed inwardly of the thrust shoulder, a plurality of shear pieces between the cover and the thrust shoulder for transmitting pressure from the former to the latter, a retaining ring for preventing displacement of the shear pieces, said retaining ring having an annular rib projecting from one face thereof, the cover having an annular groove in one face thereof to closely receive the annular rib on the retaining ring, an annular member sealing the joint between the body member and the retaining ring, a sealing member in the bottom of the annular groove, and means for forcing the retaining ring toward the cover to compress the sealing means between the bottom of the groove and the top of the rib therein, said means comprising a plurality of bolts extending through the retaining ring and threadedly received in the cover, said bolts being disposed radially inwardly of the last-mentioned sealing member.

3. Apparatus of the character described comprising a hollow pressure sustaining body member having an opening at one end, an axially outwardly facing thrust shoulder, and a radially inwardly facing annular recess between said thrust shoulder and the open end providing an axially inwardly facing thrust shoulder; a plurality of shear pieces in the annular recess; a cover in the opening substantially filling the space between the shear pieces and the outwardly facing thrust shoulder, said shear pieces transmitting pressure from the head to the inwardly facing thrust shoulder, and said cover having an axially outwardly facing annular groove adjacent its outer edge; a retaining ring preventing displacement of the shear pieces, said retaining ring comprising a main portion disposed radially inward of the shear pieces, an annular lip projecting radially outwardly from said main portion towards the wall of the body member to provide a relatively narrow joint between the body member and the retaining ring, and an annular rib projecting axially inwardly and closely received in the groove in the cover; means for sealing the joint between the body member and the retaining ring; a gasket at the bottom of annular groove in the cover; and a plurality of bolts extending radially through the retaining ring threadedly receive in the cover for retaining the former in position and for applying sealing pressure to the gasket through the annular rib.

FREDERICK K. FISCHER.